Aug. 11, 1970   J. F. O'KELLY, JR   3,524,038
METHOD AND APPARATUS FOR CUTTING AND GOUGING METAL EMPLOYING
SUCTION TO REMOVE DEBRIS
Filed May 5, 1967
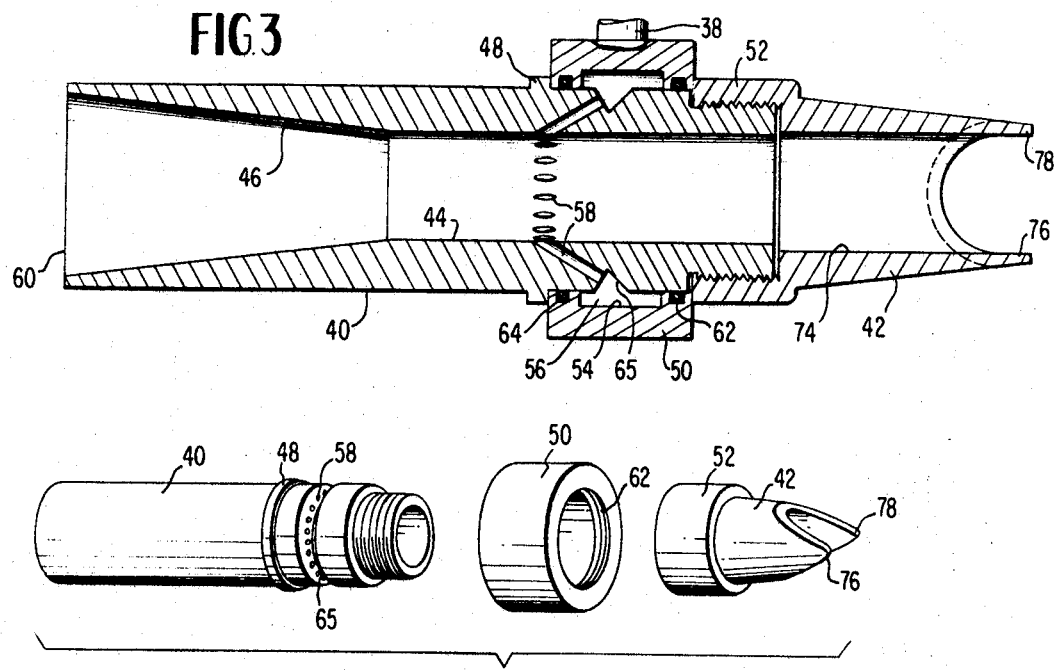
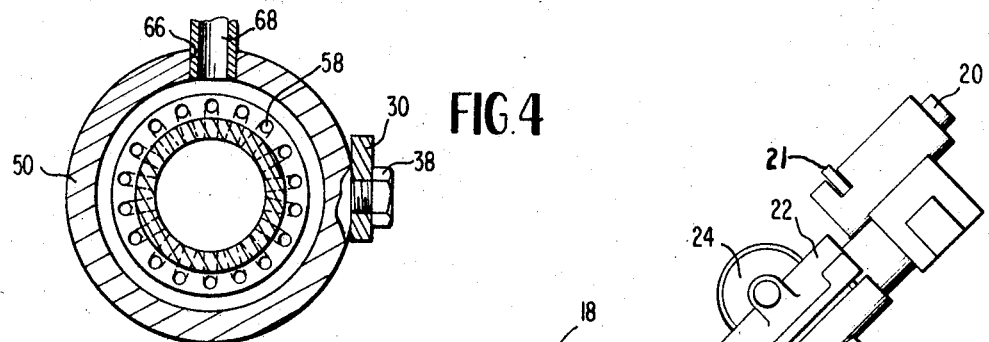
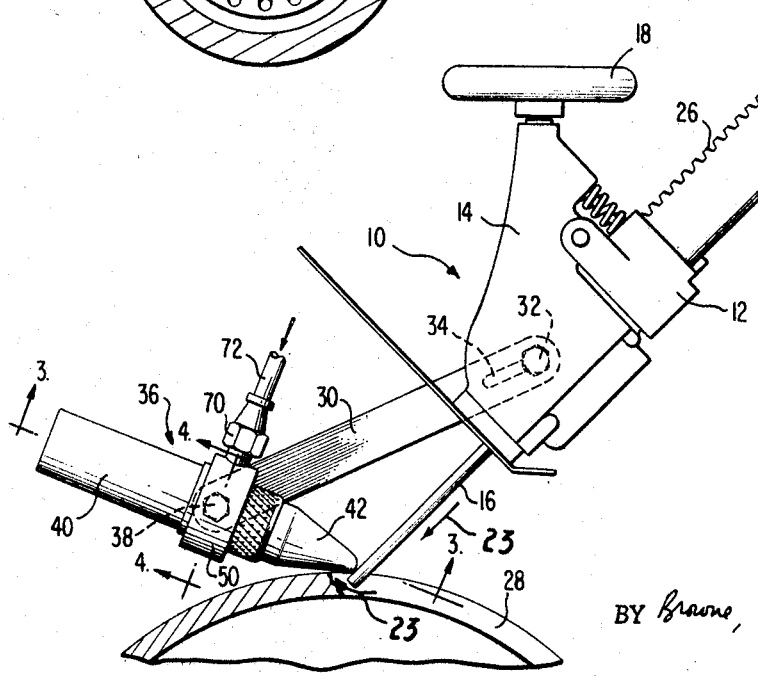
INVENTOR
JOSEPH F. O'KELLY JR.
BY Browne, Schuyler & Beveridge
ATTORNEYS

United States Patent Office 3,524,038
Patented Aug. 11, 1970

3,524,038
METHOD AND APPARATUS FOR CUTTING AND GOUGING METAL EMPLOYING SUCTION TO REMOVE DEBRIS
Joseph Fred O'Kelly, Jr., La Porte, Tex., assignor, by mesne assignments, to Arcair Company, Allentown, Pa., a corporation of Delaware
Filed May 5, 1967, Ser. No. 636,521
Int. Cl. B23k 9/00
U.S. Cl. 219—70                                  1 Claim

ABSTRACT OF THE DISCLOSURE

A method of and an apparatus for cutting and gouging metal from a workpiece by melting the portion of the metal to be removed with an electric arc between the workpiece and an electrode supported in a holder, and applying a suction to the molten metal while maintaining the arc. The suction is applied through a nozzle supported on the electrode holder for movement therewith.

---

This invention relates to metal working, and more particularly to an improved method and apparatus for use in electric arc cutting and gouging of metals.

It is well-known to cut a metal body, or to remove a portion of a metal body, by heating and melting the portion of the body with an electric arc and forcibly blowing the molten metal from the body by jets of high velocity air directed into the molten metal. Such a method of cutting and gouging, and an apparatus suitable for carrying out this method, is disclosed in Stepath et al. Pat. No. 2,706,236. While the method and apparatus disclosed in this Stepath patent is widely used in industry, it has certain inherent limitations which may restrict its use in some circumstances. For example, the jets of high velocity air employed to remove the molten metal may, under some conditions, tend to blow the molten metal through a workpiece which is being cut by this electric arc-gas jet process. Thus, in cutting metal pipes or in cutting openings in pipes, for example, a substantial portion of the material removed during the cutting process may be blown into the pipe being cut. Further, when this electric arc-gas jet process is employed to gouge metal, i.e., remove a portion of the metal without cutting completely through the workpiece, the molten metal removed by the jets of high velocity air is widely dispersed.

An object of the invention is to provide an improved method and apparatus for cutting a metal workpiece in which an electric arc torch is employed to melt a portion of the workpiece, and in which the molten metal is removed from the workpiece on the same side thereof as the torch.

Another object of the invention is to provide an improved method and apparatus for the electric arc cutting and gouging of metals in which an electric arc torch is employed to melt a portion of the workpiece, and in which a vacuum is employed to remove the molten metal from the workpiece.

Another object is to provide such a method and apparatus in which a vacuum is employed in cooperation with the conventional gas jets to remove the molten metal from the workpiece.

In the attainment of the foregoing, and other objects, an important feature of the invention resides in providing a torch including an electrode holder for supporting an elongated solid rod carbon electrode with one end of the electrode projecting outwardly from the holder. Electric current is supplied to the electrode through the holder so that an arc may be struck and maintained between the projecting end of the electrode and a metallic workpiece. The holder also includes a suction nozzle with the inlet of the nozzle being adjustably positioned adjacent the tip of the electrode. Means are provided for applying a suction to the nozzle to forcibly remove metal melted by the electric arc and to direct the molten metal away from the end of the electrode.

While the molten metal may be removed by suction alone, it has been found that, in certain cutting and gouging operations, a more efficient job is accomplished when the suction is employed in conjunction with the conventional gas jets. Surprisingly, the vacuum prevents the molten metal from being blown through the workpiece during cutting operations, and the jets and suction cooperate to do a very efficient job of metal removal.

Other objects and advantages of the invention will become apparent from the following detailed description, taken with the drawings, in which:

FIG. 1 is a side elevational view of an electric arc cutting and gouging torch embodying the present invention;

FIG. 2 is an expanded perspective view of the suction device of the torch;

FIG. 3 is a sectional view taken on line 3—3 of FIG. 1; and

FIG. 4 is a sectional view taken on line 4—4 of FIG. 1.

Referring now to the drawings in detail, an electric arc cutting and gouging torch according to the present invention is illustrated generally by the reference numeral 10, and includes an electrode holder 12 of the general type illustrated in Stepath Pat. No. 3,210,514. The electrode holder 12 includes a resiliently biased drive bracket 14 for clamping and holding an elongated solid rod carbon electrode 16, and a manually controlled electrode drive mechanism, actuated by hand wheel 18, for projecting the electrode 16 from within the electrode holder 12. A connector 20 is mounted on the body of the torch 10 for connecting a flexible fluid conduit having an electric cable mounted concentrically therein to provide electric current to the electrode 16 and air under pressure to the torch. A valve 21 is provided in connector 20 to control the flow of air to the torch. This air may be directed through nozzles (not shown) in the end of the torch in high velocity jets longitudinally along the electrode 16 as indicated by arrows 23. The structural details of the electrode clamping and driving mechanism, per se, form no part of the instant invention, but may be understood by reference to Pat. No. 3,210,514, mentioned above.

The electrode holder assembly may be supported for movement by a traveling carriage (not shown) by a sleeve 22 which slidably receives a cylindrical portion of the electrode holder 12, as shown in Stepath Pat. No. 2,903,-554. The sleeve 22 may include a manually rotatable pinion assembly 24 which engages a rack 26 on the electrode holder, whereby the torch 10 may be manually advanced as a unit toward or away from a workpiece 28.

An elongated support arm 30 is mounted on drive bracket 14 by a single bolt 32. The bolt 32 extends through an elongated slot 34 in support arm 30 so that the arm may be adjusted relative to the drive bracket 14, both rotationally about the axis of bolt 32, and longitudinally through slot 34. The arm 30 projects outwardly from the electrode holder 12 in the general direction of workpiece 28, and supports a suction assembly 36 on its distal end. The suction assembly 36 is mounted on arm 30 by a single bolt 38 and may be adjusted rotationally about the axis of bolt 38.

As best seen in FIGS. 2 and 3, suction assembly 36 comprises an elongated hollow body portion 40 having an inlet nozzle 42 threadedly mounted on one end thereof. The body portion 40 has a throat segment 44 defined by a cylindrical bore extending from the nozzle 42 to an outwardly divergent conical discharge segment 46. A radially extending annular shoulder 48 is formed on the outer surface of body portion 40, at throat segment 44, and an annular sleeve 50 is mounted on the outer surface of body 40 and clamped between shoulder 48 and a raised shoulder 52 on nozzle 42. Sleeve 50 has an annular recess 54 formed around its inner periphery to define, with the outer surface of body 40, an annular fluid chamber 56. A plurality of passages 58 are drilled through the side wall of body 40 from the fluid chamber 56 into the throat 44 of the suction assembly, with the fluid passages 58 being inclined axially of the body portion toward the conical exhaust portion 46 so that fluid flowing from the chamber 56 through the passages 58 will be directed toward the outlet 60 of the assembly. A pair of O-ring seals 62, 64 provide a fluid seal between sleeve 50 and body 40. An annular V-shaped groove 65 is formed around the periphery of throat segment 44 to facilitate drilling of the passages 58.

The inlet nozzle 40 has a cylindrical bore 74 which is coaxial and communicates with the cylindrical bore of the suction assembly throat segment 44. The inlet end of the nozzle 42 is formed with a pair of opposed, axially extending shields 76, 78 which act to control the flow of air into the nozzle. The shields 76, 78 are integrally formed with the nozzle by removing a portion of the substantially cylindrical nozzle blank at the inlet end from opposite sides of the blank. The portions removed are substantially wedge-shaped in profile and are removed along planes inclined with respect to and intersecting along a line perpendicular to the longitudinal axis of the nozzle.

In operation of the device, an elongated electrode 16 is positioned in the holder 12, and hand wheel 18 is rotated to project one end of the electrode 16 outwardly from the holder the desired distance. The suction assembly 36 is then positioned so that the inlet end of nozzle 42 is closely adjacent the projecting end of the electrode and an arc is struck between the end of the electrode and a workpiece 28. This arc is maintained to melt a portion of the metal of the workpiece, and the molten metal is removed from the workpiece by the suction device 36.

To remove the molten metal, high pressure air is directed through tube 72 into the fluid chamber 56 and flows into the throat 44 of the assembly through the drilled passages 58 in a plurality of high-speed jets. These jets are inclined toward the outlet end of the suction apparatus and, in accordance with well-known fluid laws, cause a reduced pressure in the suction apparatus between the drilled passages 58 and the inlet nozzle 42. The reduced pressure causes a rapid flow of air into the nozzle from the vicinity of the electrode tip which draws the molten metal into the inlet of the suction device. The guards or shields 76, 78 control this flow of air into the suction device so that a maximum suction is obtained in the area of the molten metal. As the molten metal passes the discharge openings of the drilled passages 58, it is forcibly blown outwardly through the outlet 60.

From FIG. 1, it is believed apparent that a suction applied through the inlet nozzle will cause a flow of air through a kerf formed by the apparatus and will prevent any of the molten metal from dropping through a workpiece being cut by the device. This is of particular importance in cutting openings in the wall of closed chambers, pipes, conduits, or the like, where it is undesirable to have the slag or molten metal from the arc to drop through the kerf being formed by the device. The shields 76, 78 serve to increase the suction at the arc by limiting the flow into the nozzle from the sides.

Simultaneous with operation of the suction device, valve 21 may be manually actuated to direct a flow of high pressure air through the torch to be discharged in high velocity jets, or streams, flowing longitudinally along the electrode toward the workpiece 28. As shown in FIG. 1, these jets are on the side of electrode 16 opposite the suction nozzle 42 so that the air flows beneath the electrode and into the nozzle. These jets have been found to greatly increase the flow of air into the nozzle and thereby greatly increase the efficiency of the device in removing the molten metal. Surprisingly, the suction is effective to prevent the jets from blowing the molten metal through a workpiece which is being cut completely through by the torch.

It is believed apparent that the discharge end of the suction apparatus could be curved to deflect the molten metal in any direction desired, and could be led to a receptacle through a flexible conduit or the like, if desired, to collect the hot slag and metal removed by the device.

Accordingly, while I have disclosed a preferred embodiment of my invention, I wish it understood that I do not intend to be restricted solely thereto, but that I do intend to include all embodiments thereof which would be apparent to one skilled in the art and which come within the spirit and scope of my invention.

I claim:
1. In an electric arc cutting and gouging torch including a holder for supporting an elongated carbon rod electrode with one end projecting outward from the holder, means for supplying electric current to an electrode supported in said holder to maintain an electric arc between said one end and a metal workpiece to melt a portion of the workpiece adjacent said one end of said electrode, and means for forcibly removing the metal melted by said arc, the improvement wherein the means for forcibly removing the molten metal comprises, a suction device including an elongated body portion having an open inlet end defining a suction nozzle and an outlet portion having an outward diverging frusto-conical inner surface and terminating in an open end, an annular chamber extending around the outer periphery of said body between said inlet and said outlet portions, means for directing a supply of high pressure air to said chamber, and a plurality of passages extending from said chamber into said body for directing a plurality of jets of high velocity air into said suction device in the direction of said outlet portion to thereby induce a flow of air through said hollow body from said inlet nozzle to produce a partial vacuum in the vicinity of said arc and cause said molten metal to be drawn into said nozzle, a pair of shields integrally formed on said body and projecting outwardly from said open inlet in the direction of said electrode and spaced one on each side of said electrode, said shields cooperating to increase the suction at said arc, and means for directing a high velocity stream of gas longitudinally along said electrode toward said workpiece and on the side of said electrode opposite said inlet nozzle.

References Cited

UNITED STATES PATENTS

| | | | |
|---|---|---|---|
| 1,137,834 | 5/1915 | Bowers | 219—70 |
| 2,308,860 | 1/1943 | Clark. | |
| 2,602,180 | 7/1952 | Miller. | |
| 3,210,514 | 10/1965 | Stepath | 219—70 |
| 2,955,187 | 10/1960 | Campo | 228—20 |
| 3,045,095 | 7/1962 | Usher et al. | 228—20 X |

RALPH F. STAUBLY, Primary Examiner

U.S. Cl. X.R.

228—20